Patented May 20, 1924.

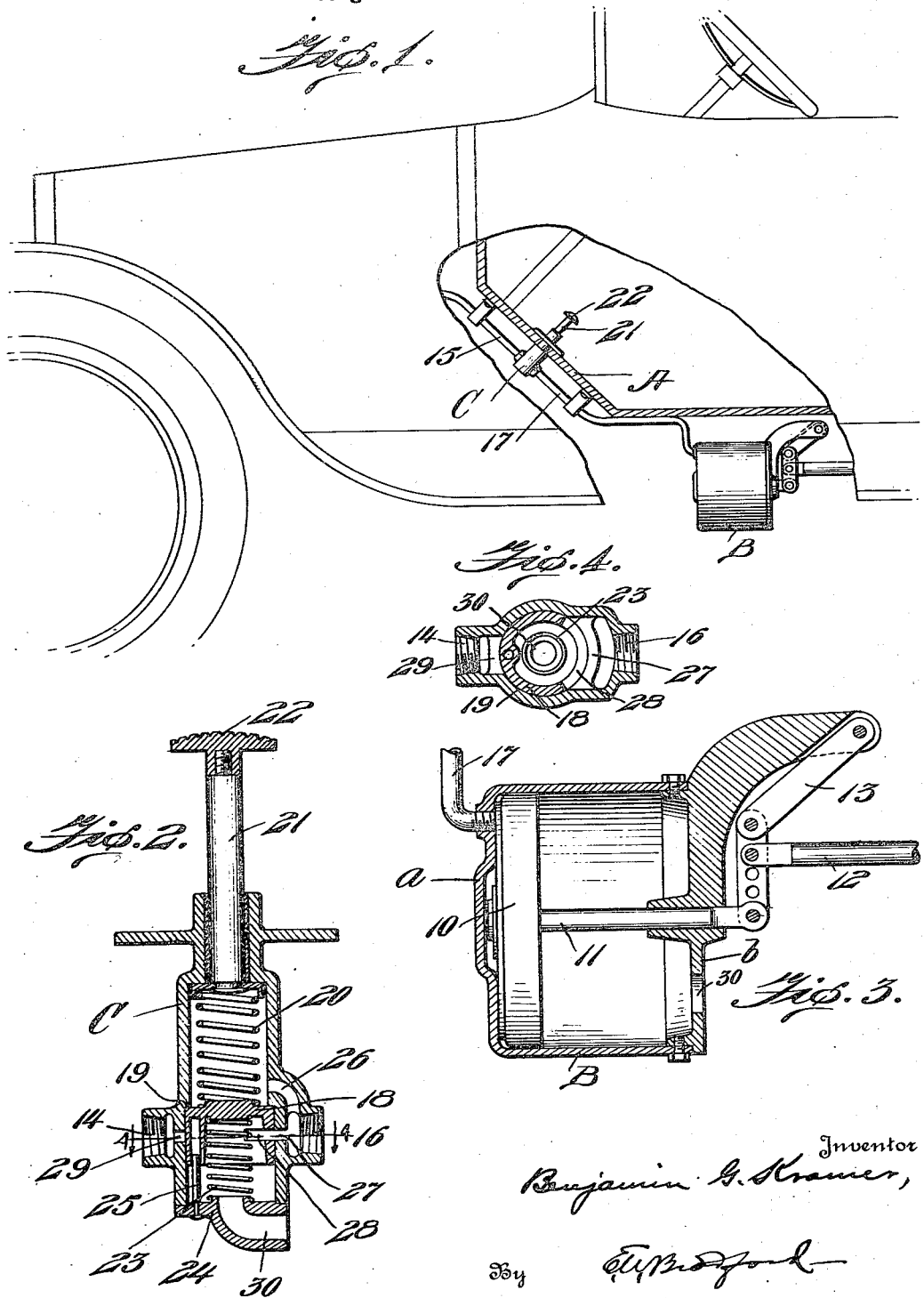

1,495,081

UNITED STATES PATENT OFFICE.

BENJAMIN GEORGE KRAMER, OF ANDERSON, INDIANA.

VALVE FOR AIR LINES.

Refiling of application Serial No. 137,256, filed December 15, 1916, and abandoned August 7, 1920. This application filed January 19, 1924. Serial No. 687,350.

*To all whom it may concern:*

Be it known that I, BENJAMIN G. KRAMER, a citizen of the United States, residing at Anderson, in the county of Madison and State of Indiana, have invented certain new and useful Improvements in Valves for Air Lines, of which the following is a specification.

In the use of vacuum brakes for vehicles, such as automobiles, particularly brakes of the general type illustrated in Dickson patent #1,076,198, some means are desirable for enabling the operator to apply the brake gradually, or with varying degrees of power, so that the brake may be set and controlled to suit the various conditions under which the use of a brake is required.

The object of my said invention is to provide a valve by which the operator may control the vacuum power of an apparatus of the general type shown in said Dickson patent, and regulate the movement of the brake applying means and the setting of the brake at will, all as will be hereinafter more fully described and claimed.

Referring to the accompanying drawings, which are made a part hereof, and on which similar reference characters indicate similar parts, Figure 1 is a view of the front end of an automobile equipped with a vacuum brake of the general type referred to and provided with a valve of my improved construction, Figure 2 a central vertical section through the valve itself, Figure 3 a central longitudinal section through the vacuum cylinder showing the connection to the valve, and Figure 4 a detail cross section through the valve as on the dotted line 4—4 in Figure 2.

In said drawings the portions marked A represent the footboard in the automobile, B the vacuum cylinder and C the valve casing.

The vacuum cylinder B is of substantially the same type shown in said Dickson patent, having a piston 10 with a piston rod 11 connected to the brake rod 12 through a link mechanism 13, all of which forms no part of my present invention, but is illustrated to enable the use of the valve to be better understood.

The valve C comprises a casing with a lug on one side having a port 14 with which a pipe 15, running to the intake of the engine, is connected. On the opposite side it has a lug having a port 16 with which pipe 17, running to the vacuum cylinder, is connected. A reciprocating valve 18 is mounted in said casing, its upward movement being limited by a shoulder in said casing at point 19. A coiled spring 20 is interposed between the upper face of said valve, and the inner end of an operating plunger 21. Said plunger 21 has a head 22 adapted for being operated by the foot. Another coiled spring 23 of weaker power than spring 20 is interposed between the underside of valve 18, and the bottom 24 of the casing. A guide pin 25 extends up vertically from the bottom 24 and slides in a perforation in the wall of said valve 18 to prevent any rotary movement of said valve in the casing. Port 16 has a branch 26 leading to the chamber above valve 18 to keep said chamber in communication with the vacuum cylinder, and it communicates through a port 27 with port 28, (both in the form of a slot) in the wall of valve 18. Said port 28 registers with slot 27 when the valve is in the position it occupies when not in use, or when the brake is not set. A port 29 is formed through the opposite wall of the casing C and an exhaust port 30 through the bottom.

In operation, the parts being in the relation shown in Figure 1, and it being desired to set the brake, the operator places his foot upon the head 22 of plunger 21 and forces down said plunger until the tension of spring 20 is sufficient to overcome the atmospheric pressure and the power of spring 23 and force downward the valve 18. As soon as valve 18 passes the ports 27 and 29, a direct communication will be establishedd between the intake manifold of the engine and the suction side of cylinder B, thus creating a vacuum in said cylinder B behind piston 10, and said piston will be drawn toward the position shown in Figure 3. The movement of said piston toward the suction end of said cylinder is controlled by the movement of plunger 21 and valve 18, inasmuch as, the tension of spring 20 is regulated by the degree of its compression and the force to overcome said tension is likewise determined. In other words, piston 10 will move toward the suction end $a$ so long as the power of the vacuum, created by the suction, is less than the power of the spring. When it reaches the point where these two powers substantially balance then the power of spring 23, and the atmospheric pressure from below will move piston 18 upward, closing port 29 and holding piston 10 and the brake mechanism, which it controls, at a standstill. Should it be desired to set the brake harder, the operator merely forces down plunger 22 a little further, which again opens the port 29 to the intake manifold and causes further suction in the suction end of cylinder B, and draws piston 10 still further toward the end of its movement, until the suction again balances, or slightly overbalances the tension of spring 20, causing valve 18 to return slightly and close port 29 and hold the parts at a standstill, so long as plunger 22 is held stationary. By releasing pressure upon plunger 22 the tension of spring 20 is relaxed, valve 18 is permitted to return to its seat against shoulder 19, which brings port 28 into communication with port 27 and permits air to rush in through the port 30 and pipe 17, allowing piston 10 to be drawn in the reverse direction by the spring mechanism commonly employed to relieve the brake. It is understood that openings 30 are provided in the end $b$ of cylinder B to allow free flow of air to and from said cylinder outside said piston. It will thus be seen that piston 10 is responsive to plunger 21, and moves back and forth as said plunger is moved up and down to increase or diminish the tension of spring 20 to move valve 18 to uncover port 29. It will also be seen that as soon as the movement of plunger 21 stops the movement of piston 10 will stop as the suction will promptly overcome the tension of said spring and valve 18 will move up until port 29 is closed and further suction cut off. By this means, the operator, with his foot on head 22 of plunger 21, can control the position of piston 10 and through the brake mechanism, operated by said piston, the position of the brake, with perfect ease and a great degree of delicacy, so far as the degree of braking power is concerned. The slightest variation of said plunger will effect the brake inasmuch as, in locked position, the valve 18 stands balanced, and any increase in the tension of spring 20 will overcome the balance and increase the suction, or vacuum power, and set the brakes harder, while any relaxation in the tension of said spring will allow said valve to seat against shoulder 19 and open up communication from the vacuum cylinder to the outside air, releasing piston 10 from the suction or vacuum, and permitting the brake bands to expand under spring tension and release the brake drums, as will be readily understood.

It will be understood, of course, that many modifications in the form and application of this invention may be made, and may readily suggest themselves to those skilled in the art. While I have shown the device in use with an internal combustion engine, it will be understood to be adapted for use with any means for creating suction, and also with any means for applying the power, and that my invention is therefore not intended to be limited to the exact structure shown, but rather to embrace all modifications within the scope of the claims.

This application is filed to take the place of application No. 137,256, filed December 15, 1916, by the same inventor.

Having thus fully described my said invention what I claim as new and desire to secure by Letters Patent, is:

1. A valve for controlling air pressure comprising a casing, ports leading through said casing communicating on the one side with the intake main of an internal combustion engine on the other side with a vacuum operated brake cylinder and at the lower end with the atmosphere, a piston chamber, a piston valve in said chamber, a by-pass connecting one port with said piston chamber above the piston valve, and a manually operated plunger for operating the piston valve, substantially as set forth.

2. A valve controlling air pressure comprising a casing, ports leading through said casing and communicating on one side with the intake main of an internal combustion engine and on the opposite side with a brake control cylinder, a plunger within said casing, and a sliding piston valve within said casing adapted to be moved by means of the plunger to open said ports and by means of a spring to close said ports, substantially as set forth.

3. A valve for controlling air pressure comprising a casing, ports in said casing, a plunger, a spring bearing against said plunger, a piston valve bearing against said spring and supported on a small spring, said valve adapted to be pressed down by said plunger to open the ports and adapted to be closed automatically by the equalizing of the pressure of the smaller spring and the vacuum pressure in the brake cylinder, substantially as set forth.

In witness whereof, I have hereunto set my hand and seal at Anderson, Indiana, this 16th day of January, A. D. nineteen hundred and twenty-four.

BENJAMIN GEORGE KRAMER. [L. S.]

Witnesses:
JAMES DAVIES,
LULU DAVIS.